(12) United States Patent
Remmler

(10) Patent No.: US 9,732,849 B2
(45) Date of Patent: Aug. 15, 2017

(54) MANUAL SHIFT TRANSMISSION

(71) Applicant: GM GLOBAL TECHNOLOGY OPERATIONS LLC, Detroit, MI (US)

(72) Inventor: Mathias Remmler, Mauchenheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/577,601

(22) Filed: Dec. 19, 2014

(65) Prior Publication Data

US 2015/0176707 A1    Jun. 25, 2015

(30) Foreign Application Priority Data

Dec. 20, 2013   (DE) .................. 10 2013 021 963

(51) Int. Cl.
| | |
|---|---|
| F16H 63/18 | (2006.01) |
| F16H 63/20 | (2006.01) |
| F16H 63/30 | (2006.01) |
| F16H 3/085 | (2006.01) |
| F16H 3/00 | (2006.01) |
| F16H 3/093 | (2006.01) |

(52) U.S. Cl.
CPC ............. *F16H 63/18* (2013.01); *F16H 3/006* (2013.01); *F16H 3/085* (2013.01); *F16H 63/206* (2013.01);
(Continued)

(58) Field of Classification Search
CPC ..... F16H 2003/0931; F16H 2003/3056; F16H 2003/3066; F16H 53/00; F16H 53/02; F16H 63/3043; F16H 63/28; F16H 63/10; F16H 63/18; F16H 63/206; F16H 63/22; F16H 2061/2876; F16H 2061/2892;
(Continued)

(56) References Cited

U.S. PATENT DOCUMENTS

| | | | | |
|---|---|---|---|---|
| 5,809,836 A | * | 9/1998 | Patzold .................. | F16H 61/30 74/337.5 |
| 6,729,200 B2 | * | 5/2004 | Paetzold ............... | F16H 63/206 74/337.5 |

(Continued)

FOREIGN PATENT DOCUMENTS

| | | | | |
|---|---|---|---|---|
| DE | 4115675 A | * | 2/1992 | ............. F16H 63/20 |
| DE | 102006054611 A1 | | 5/2008 | |

(Continued)

OTHER PUBLICATIONS

DPMA, German Search report dated Sep. 23, 2014 for DE 10 2013 021 963.9.

*Primary Examiner* — William Kelleher
*Assistant Examiner* — Joseph H Brown
(74) *Attorney, Agent, or Firm* — Lorenz & Kopf LLP

(57) ABSTRACT

A manual shift transmission is disclosed which includes a shaft, at least one loose wheel carried by the shaft and a gear shift sleeve, which is moveable along the first shaft between a gear position coupling the first loose wheel to the shaft and a neutral position allowing a rotation of the loose wheel against the shaft. A gear shift follower is configured to move the gear shift sleeve along the shaft and acts on the gear shift sleeve. An actuating rod can be shifted in the direction of the shaft for shifting the gear shift follower. The actuating rod carries a clutch body which is adjustable between an active position engaging in a recess of the gear shift follower and a passive position sunk into the first actuating rod.

15 Claims, 5 Drawing Sheets

(52) U.S. Cl.
CPC ....... *F16H 63/304* (2013.01); *F16H 63/3069* (2013.01); *F16H 63/3043* (2013.01); *F16H 2003/0931* (2013.01); *F16H 2063/3056* (2013.01); *F16H 2063/3066* (2013.01); *Y10T 74/19279* (2015.01)

(58) Field of Classification Search
CPC ......... F16H 2063/025; F16H 2063/208; F16H 2063/3056; F16H 2063/3066; F16H 3/006; F16H 3/085; F16H 3/00; F16H 3/02; F16H 3/06; F16H 3/08; F16H 3/083; F16H 63/304; F16H 63/16; F16H 63/20; F16H 63/30; F16H 3/087; F16H 63/3069; F16H 2063/3073; F16H 2063/321
USPC ............... 74/337.5, 340, 342, 473.1, 473.26, 74/473.36, 335; 192/38
See application file for complete search history.

(56) References Cited

U.S. PATENT DOCUMENTS

| | | | | |
|---|---|---|---|---|
| 7,661,331 B2 * | 2/2010 | Ogami | ................... | F16H 63/18 74/337.5 |
| 7,963,187 B2 * | 6/2011 | Goras | ................... | F16H 63/38 74/473.26 |
| 7,997,160 B2 * | 8/2011 | Goras | ................... | F16H 63/38 74/473.1 |
| 8,091,447 B2 * | 1/2012 | Garabello | ............. | F16H 63/18 74/473.1 |
| 2007/0240530 A1 * | 10/2007 | Ogami | ................... | F16H 63/18 74/330 |
| 2008/0134819 A1 | 6/2008 | Kapp et al. | | |
| 2011/0028271 A1 | 2/2011 | Whitmarsh et al. | | |
| 2011/0061487 A1 * | 3/2011 | Tooman | ............... | F16H 63/3023 74/473.36 |
| 2011/0100144 A1 | 5/2011 | Neelakantan et al. | | |

FOREIGN PATENT DOCUMENTS

| | | | | |
|---|---|---|---|---|
| DE | 102007014831 A1 | 7/2008 | | |
| DE | 102008052091 A1 | 4/2010 | | |
| DE | 102010048128 A1 | 5/2011 | | |
| DE | 102011119833 A1 | 6/2013 | | |
| EP | 1072823 A1 * | 1/2001 | ............ | F16H 63/18 |
| EP | 1505320 A2 | 2/2005 | | |
| EP | 1960700 A1 * | 8/2008 | ............ | F16H 61/32 |
| WO | 2008044049 A2 | 4/2008 | | |

* cited by examiner

MANUAL SHIFT TRANSMISSION

CROSS REFERENCE TO RELATED APPLICATION

This application claims priority to German Patent Application No. 102013021963.9 filed Dec. 20, 2013, which is incorporated herein by reference in its entirety.

TECHNICAL FIELD

The present disclosure relates to a manual shift transmission, in particular a manual shift transmission with double clutch.

BACKGROUND

Manual shift transmissions include multiple pairs of gears meshing with one another. At least one gear of each pair is formed as a loose gear, which can be coupled to a shaft carrying it in a positively joined manner with the help of a gear shift sleeve in order to establish a torque flow between input and output of the transmission via the gear pair concerned. In order to be able to realize multiple gears in a manual shift transmission, multiple gear pairs and typically also multiple gear shift sleeves are required which have to be moveable independently of one another. The actuators required for driving the movements of the various gear shift sleeves occupy installation space, which renders the transmission as a whole bulky.

US2008/0134819A1 proposes to control the movement of two gear shift sleeves mounted on a same shaft with the aid of a gear shift drum. On its circumference the gear shift drum carries two slotted control links, which interact with a gear shift follower. In each case the gear shift followers act on one of the gear shift sleeves. The pitch of the slotted links relative to the axis of rotation of the drum determines the extent and direction of the movement of the gear shift follower brought about by a rotation of the drum. Different courses of the slotted links make possible different movements of the two gear shift followers assigned to these. Although a drum is able to control the movements of two gear shift sleeves independence of the movements from one another is not achievable since at any point of the drum the possible movements are predetermined in a fixed manner and merely the direction of the rotation can be selected. Since all required combinations of positions of the gear shift sleeves have to be depicted through the course of the cams and the pitch of the cams must not be too large so that no self-locking can occur, the space requirement of this conventional shift control mechanism is also substantial.

SUMMARY

In accordance with the present disclosure a manual shift transmission is provided which makes possible the control of gear shift sleeves independently of one another using a space-saving mechanism. In particular, a manual shift transmission having a first shaft and at least one first loose gear carried by the first shaft. A first gear shift sleeve is moveable along the first shaft between a gear position coupling the first loose gear to the shaft and a neutral position allowing a rotation of the loose gear against the first shaft. A first gear shift follower is configured to move the first gear shift sleeve along the first shaft acts on the first gear shift sleeve. A first actuating rod shifts the first gear shift follower in the direction of the shaft and carries a first clutch body, which is adjustable between an active position acting in a recess of the gear shift follower and a passive position sunk into the first actuating rod.

Through the selective coupling ability of the first gear shift follower to the first actuating rod it is possible to create additionally controlling of a further gear shift follower using the first actuating rod without taking along the first gear shift follower in the process, or coupling the first gear shift follower to a second actuating rod, thereby adjusting it without simultaneously enforcing a movement of the first actuating rod. The first gear shift sleeve furthermore can be moved from the neutral position into a gear position coupling a second loose gear to the shaft.

In order to bring about the coupling to the first gear shift follower or the decoupling from the same, the first actuating rod can include a sleeve and a control rod that is moveable in the sleeve. In the passive position the clutch body is received in a passage of the sleeve and a recess of the control rod, and in active position the recess of the control rod is offset against the passage in order to drive the clutch body out of the actuating rod and into engagement with the gear shift follower.

When the control rod is rotatable about a longitudinal axis of the actuating rod between the active and the passive position, this simplifies the control of the shifting movement of the actuating rod while maintaining the active or passive position of the clutch body.

When the recess in shifting direction of the actuating rod is elongated and its extension in the shifting direction is at least equal to the freedom of movement of the actuating rod, the control rod can remain unmoved upon an axial shifting of the sleeve. By moving in the recess the clutch body maintains the passive position. For this reason, the gear shift sleeve, through an axial movement of the actuating rod, can be shifted out of its neutral position into the gear position or even from a gear position into the other without it being necessary to also move the control rod with it.

According to a first further development, the manual shift transmission includes a third loose gear and a second gear shift sleeve, which is moveable along the first shaft or a second shaft between a gear position coupling the third loose gear to this shaft and a neutral position allowing a rotation of the third loose gear against the shaft. A second gear shift follower is configured to move the second gear shift sleeve along the shaft acts on the second gear shift sleeve. The first actuating rod carries a second clutch body, which is adjustable between an active position engaging in a recess of the second shifting fork and a passive position sunk into the first actuating rod. Accordingly, the first actuating rod, depending on which of its clutch bodies is in the active position, can control the first or the second gear shift sleeve.

When the first shifting rod, as mentioned above, includes a sleeve and a control rod which is moveable in the sleeve, the control rod can include a recess which in the passive position of the second clutch body together with a second passage of the sleeve receives the second clutch body.

In the simplest case, this recess is identical to the above-mentioned recess for receiving the first clutch body and, depending on orientation of the control rod, receives the first or the second clutch body. In order to make possible an axial movement of the actuating rod without simultaneously driving a gear shift follower, a position of the control rod can be provided in which the clutch bodies jointly take up the passive position.

According to another development, the manual shift transmission includes a second actuating rod which can be shifted for shifting the first gear shift follower in the direction of the shaft and which carries a third clutch body, which is adjustable between an active position engaging in a recess of the first gear shift follower and a passive position sunk into the second actuating rod. Such a further development is practical, above all, in the case of a double clutch transmission in order to be able to optionally couple the movement of the first gear shift follower by means of the first actuating rod to a first friction clutch or by means of the second actuating rod to a second friction clutch.

In the case of this manual shift transmission, both actuating rods, as mentioned above, can each include a sleeve and a control rod that is moveable in the sleeve. When the control rods of the first and of the second control rod are connected to one another, only a single common drive is needed for both. The control rods can be unitarily connected; in the simplest case, these are sections of a single, straight rod.

In order to drive the movement of the first actuating rod, a slotted link can be provided which is rotatable about the first actuating rod and interacts with a cam of the first actuating rod in order to couple a rotation of the slotted link and a shifting of the actuating rod to one another. For shifting the actuating rod, the slotted link should have at least one section running on a helical path. In particular, such a section running on a helical path can interact with the cam when the gear shift sleeve is located between the neutral position and the gear position.

A position of the cam, in which the gear shift sleeve is in the neutral position, can lie in the middle on the section running on the helical path. The rotation of the slotted link then makes possible shifting the gear shift sleeve out of the neutral position into two gear positions located opposite one another.

Alternatively, the neutral position of the sleeve can also correspond to a position of the cam at an end of the section running on the helical path; a slotted link section following this end running in circumferential direction allows a rotation of the slotted link which leaves the gear shift sleeve in the neutral position.

In a section of the slotted link running in circumferential direction, the cam can also be located when the gear shift sleeve take up the gear position. On the one hand, this reduces the requirements in terms of the precision of the control of a rotation of the slotted link since the gear position is exactly reached even in particular when the rotation of the slotted link is not exactly controlled while the section running in circumferential direction on the other hand allows a drive of the slotted link to continue even after the gear position has been reached. Accordingly, a single actuator can drive both the rotation of the slotted link as well as, when the gear shift sleeve is in the gear position, an opening and closing movement of a friction clutch.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
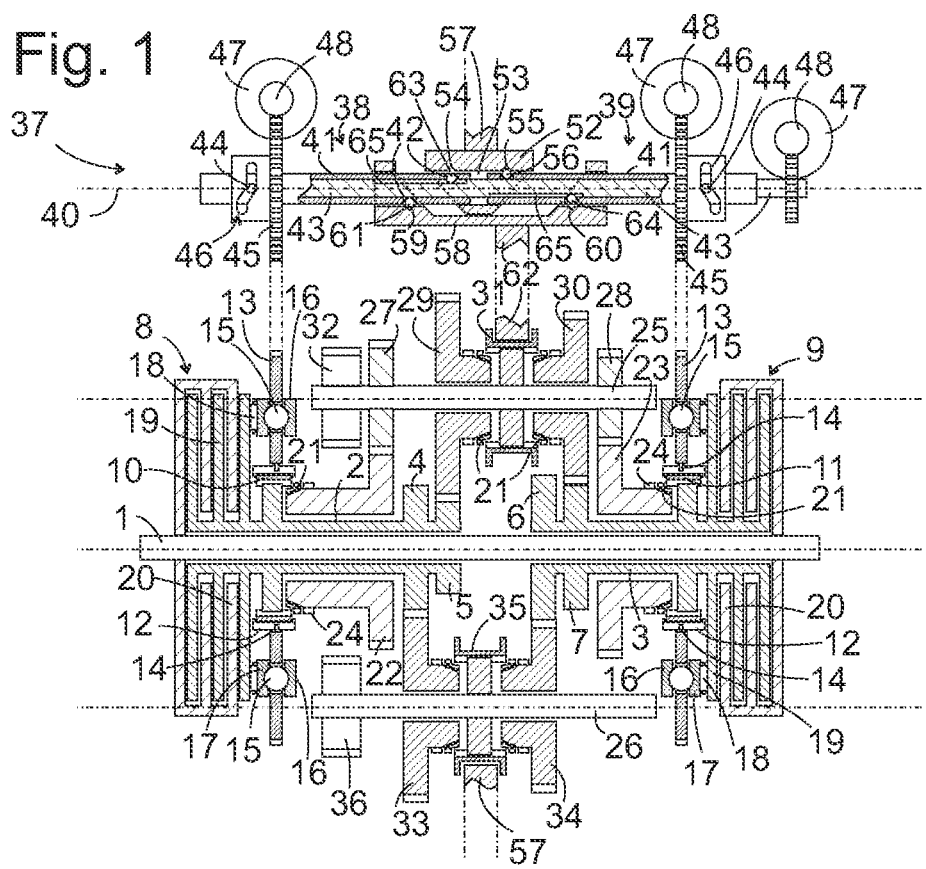
FIG. 1 is a schematic representation of a manual shift transmission according to a first configuration of the present disclosure in neutral position.

FIG. 1 shows in a schematic representation a manual shift transmission according to a first configuration of the present disclosure. A driveshaft 1 carries two hollows shaft 2, 3 which are equipped with gears 4, 5 and 6, 7 respectively. The hollow shafts 2, 3 can each be coupled to the driveshaft 1 in a non-positive manner via a friction clutch 8 and 9 respectively. On both hollow shafts 2, 3 a gear shift sleeve 10 and 11 respectively is mounted in each case in a rotationally fixed and axially adjustable manner. The gear shift sleeves 10, 11 rotating with the hollow shafts 2, 3 are each surrounded by a ring 12, which with respect to a housing of the manual shift transmission which is not shown is rotationally fixed but axially moveable. The ring 12 in turn is surrounded by a gear 13 that is coaxial with respect to the driveshaft 1. The gear 13 is pivotable about the ring 12 and engages by means of a pin 14 into a groove of the ring 12. Balls 15 are captive in bores of the gear 13. The balls 15 in each case touch on the one hand a ramp 16 which is fixed on the housing of the manual transmission and on the other hand an axially moveable ring 17 extending in each case about one of the hollow shafts 2, 3, which ring 17 is supported via a rolling bearing 18 on plates 19 of the friction clutch 8 and 9 on the hollow shaft side.

FIG. 1 shows the gears 13 in a neutral position, out of which it is adjustable in opposite directions. Upon each rotation of the gear 13 out of the neutral position it initially passes through an angle interval in which the balls 15 in axial direction are not deflected by the ramp 16. On leaving this angle interval, the balls 15 are pressed against the plates 19 by the ramp 16 and eventually force these into non-positive contact with plates 20 of the friction clutches 8 and 9 on the driveshaft side.

Starting out from a neutral position, the groove of the ring 12 runs in a first direction of rotation in circumferential direction so that upon rotation of the gear 13 in this first direction following the leaving of the abovementioned angle interval the friction clutch 8 and 9 respectively closes without the ring 12 and the gear shift sleeve 10 or 11 controlled by said ring 12 moving axially. In the opposite second direction of rotation, the groove initially runs helically so that through a rotation of the ring 12 out of the neutral position in this second direction the gear shift sleeve 10 and 11 respectively is axially adjusted. In a manner known from conventional locking synchronizing devices the gear shift sleeve 10 and 11 respectively in the process initially strikes against a synchronizing ring 21, bringing the latter into frictional contact with a gear wheel 22 and 23 respectively, in order to, when the latter is synchronized with the hollow shaft 2 and 3 respectively, engage in a gear shift toothing 24 of the gear wheel 22, 23 thus coupling it to the hollow shaft 2 and 3 respectively in a rotationally fixed manner. When the gear shift sleeve 10 and 11 respectively has engaged in the gear shift toothing 24, the pin reaches a further section of the groove running in circumferential direction so that the gear shift sleeve 10 and 11 respectively is no longer shifted further when the balls 15 reach the ascending section of the ramp 16 and start to deflect the plates 19.

The transmission has two auxiliary shafts 25, 26. The auxiliary shaft 25 carries a fixed gear 27, which meshes with the gear wheel 22, a fixed wheel 28, which meshes with the gear wheel 23, a loose wheel 29, which meshes with the gear 5, a loose wheel 30, which meshes with the gear 7, a gear shift sleeve 31, which can be shifted out of its neutral position shown in FIG. 1 in opposite directions in order to couple in each case the loose wheel 29 and the loose wheel 30 respectively to the auxiliary shaft 25 in a rotationally fixed manner and an output pinion 32. The auxiliary shaft 26 carries a loose wheel 33, which meshes with the gear 4, a loose wheel 34, which meshes with the gear 6, a gear shift sleeve 35, which can be shifted out of the neutral position shown in FIG. 1 in opposite directions in order to in each case couple one of the loose wheels 33, 34 to the auxiliary shaft 26 in a rotationally fixed manner and an output pinion 36. Both output pinions 32, 36 mesh with a differential which is not shown in FIG. 1.

A control mechanism 37 is shown in FIG. 1 set off from the components of the manual shift transmission described above for the sake of improved clarity. The control mechanism 37 includes two actuating rods 38, 39 which are oriented along a same longitudinal axis 40 that is parallel to the shafts 1, 25, 26. The actuating rods 38, 39 each include a sleeve 41 with radial passages 42 and a control rod 43 extending in the sleeve 41. In the configuration of the control mechanism 37 shown in FIG. 1, the control rods 43 of the two actuating rods 38, 39 are unitarily connected.

Each sleeve 41 carries a cam 44, which interacts with a slotted link 46 which here is formed as a groove of a gear 45 that is rotatable about the sleeve 41. Each gear 45 meshes directly or indirectly with one of the gears 13 and with a worm screw 48 driven by one of the actuators 47. The slotted links 46—in the same manner as the grooves of the rings 12 which are not shown in FIG. 1—each have sections 49, 50 extending about the longitudinal axis 40 in circumferential direction and a helical section 51 connecting the sections 49, 50 which are axially offset against one another, which in interaction with the cam 44 each drives an axial movement of the sleeve 41.

A first gear shift follower 52 has a passage 53 that is coaxial to the longitudinal axis in which the actuating rods 38 act from opposite directions and in which the ends of their sleeves 41 are located opposite one another. In the passage 53, two radial recesses 54, 55 are formed.

In the orientation of the control rods 43 shown in FIG. 1, a ball 56 as clutch body is held in engagement with one of the passages 42 and the recess 55 and couples the gear shift follower 52 in translation to the right actuating rod 39. A shifting fork 57 originating from the gear shift follower 52 engages in a groove of the gear shift sleeve 35 in order to couple the same in translation to the actuating rod 39.

A second gear shift follower 58 engages about the control rods 38, 39 on both sides of the gear shift follower 52 and is likewise provided with recesses 59, 60. A ball 61, which engages in one of the passages 42 of the left actuating rod 38, couples the gear shift follower 58 and, via a shifting fork 62 carried by it, the gear shift sleeve 31 in translation to the actuating rod 38.

Further balls 63, 64 are located opposite the recesses 54, 60, but do not engage in these since they are held through magnetic force in axially elongated recesses 65 of the control rods 43 without protruding over the sleeves 41.

In the representation of FIG. 1, the transmission is in neutral, the hollow shafts 2, 3 are rotatable against the driveshaft 1, and loose wheels 29, 30 and 33, 34 are rotatable against the auxiliary shafts 25 and 26 respectively. In order to engage a first gear in the transmission, a torque flow has to be established from the driveshaft 1 to the differential via the wheels 5, 29. To this end, the left actuator 47 is actuated in a first step in order to rotate the left gear 45 meshing with it so that the cam 44 passes through the helical section 51 of the slotted link 46 and reaches the position on the boundary between the sections 51, 50 shown in FIG. 2. Because of this, the sleeve 41 of the left actuating rod 38 which is connected to the cam 44 in a fixed manner is shifted in axial direction and as a consequence of the engagement of the ball 61 on the gear shift follower 58, the latter is taken along and shifts the gear shift sleeve 31 controlled by it to the left.

Figure 2:
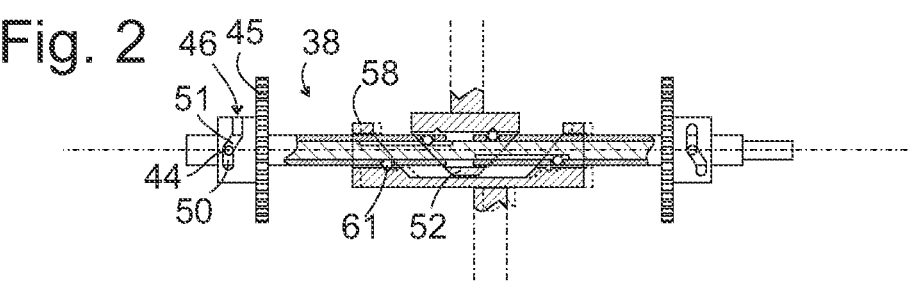
FIG. 2 is a gear shift sleeve control mechanism of the manual shift transmission from FIG. 1 in neutral position with pre-selected first gear.

The gear shift sleeve 31 and the coupling of the loose wheel 29 to the auxiliary shaft 25 brought about by it are not shown in FIG. 2 since these are based on the locking synchronization principle thoroughly known to the person skilled in the art; the synchronizing ring 21 blocks the advancing of the gear shift sleeve 31 in conventional manner for as long as the loose wheel 29 is synchronized through friction with the auxiliary shaft 25. Only when the synchronizing ring 21 of the gear shift sleeve 31 releases the path in order to engage on the loose wheel 29 can the cam 44 advance as far as into the position shown in FIG. 2.

Together with the left gear 45, the left gear 13 is also rotated out of its neutral position, however not yet so far as for axial displacement of the balls 15 captive in the gear 13 to occur. The friction clutch 8 therefore continues to be open; although the gear shift sleeve 31 is engaged on the loose wheel 29 in a non-positively joined manner, no torque is transmitted yet.

Figure 3:
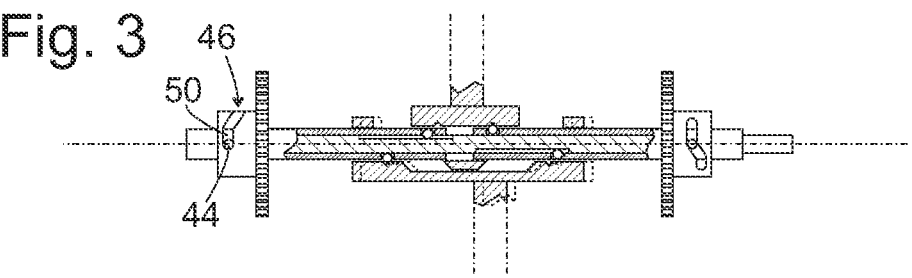
FIG. 3 is the control mechanism with engaged first gear.

Through a further rotation of the left actuator 47, the cam 44 as shown in FIG. 3, reaches a stop at the end of the section 50 of the slotted link 46. While the cam 44 passes through the section 50, the left gear 13 also continues to rotate and its balls 15 are axially deflected on the ramp 16. Because of this, the plates 19, 20 of the left friction clutch 8 are gradually pressed against one another, the friction clutch 8 closes and the torque flow in the first gear materializes.

In order to shift into the second gear, the right actuator 47 is put in motion. It rotates the right gear 45, so that the cam 44 of the actuating rod 39 moves through the section 49 of the slotted link 46. Since the section 49 runs in circumferential direction, the actuating rod 39 is not moved by the rotation. In the position shown in FIG. 4, the rotation of the co-rotating right gear 13 is advanced so far that its balls 15 are slightly deflected axially and the plates 19, 20 of the friction clutch 9 start to touch one another.

Figure 4:
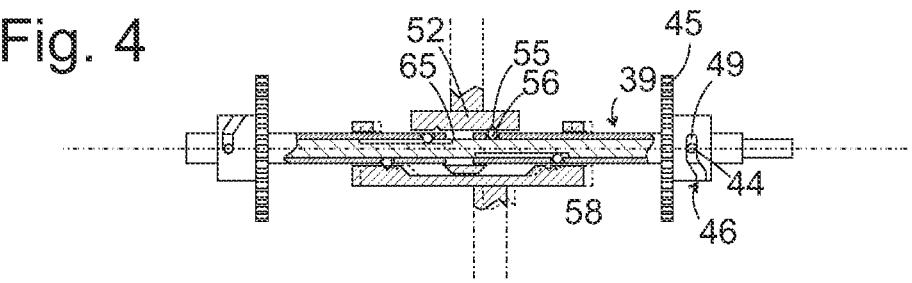
FIG. 4 is the control mechanism with engaged first and pre-selected second gear.
Figure 5:
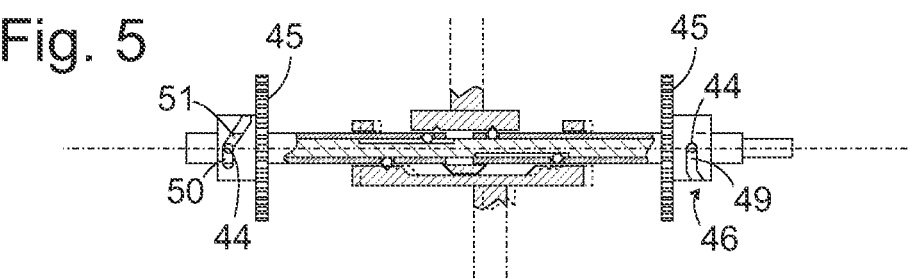
FIG. 5 is the control mechanism following the engaging of the second gear, with still pre-selected first gear.

While the right gear 45 is rotated further beyond the position shown in FIG. 4 until the cam 44 has reached a stop at the end of the section 49 and closes the clutch 9, the left gear 45 is simultaneously rotated in opposite direction so that the cam 44 of the actuating rod 38 returns to the boundary between the sections 50, 51. In this state shown in FIG. 5, the torque flows in the second gear via the gear wheel 23 and the fixed wheel 28, the clutch 8 is open again. The first gear is still pre-selected.

Figure 6:
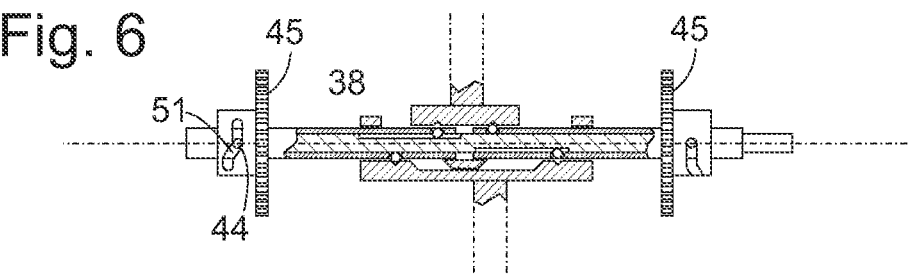
FIG. 6 is the control mechanism with engaged second gear, following cancellation of the pre-selection of the first gear.

When the left gear 45, as shown in FIG. 6, is rotated back further, the cam 44 again passes through the section 51, the actuating rod 38 returns into its position shown in FIG. 1 and the gear shift sleeve 31 is again located in its neutral position between the loose wheels 29, 30. Pre-selection of the first gear is cancelled because of this. The position of the right gear 45 meanwhile does not change so that the second gear in FIG. 6 continues to be engaged.

Figure 7:
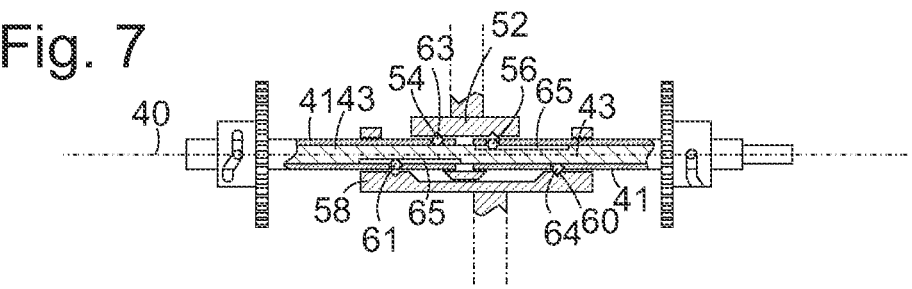
FIG. 7 is a preparatory step for engaging the third gear.

In FIG. 7, the control rods 43 in the interior of the sleeves 41 are rotated by 180° about the axis 40 so that the recesses 65 of the control rods 43 now receive the balls 56, 61, whereas the balls 63, 64 are forced out of the recesses 65 and brought into engagement with the recesses 54, 60 of the gear shift follower 52 and 58 respectively.

Figure 8:
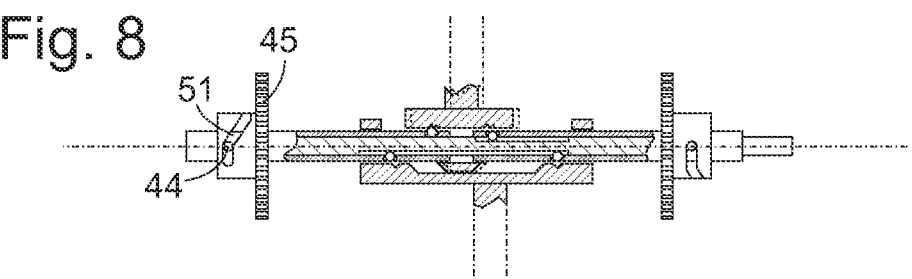
FIG. 8 is the control mechanism with pre-selected third gear.

Renewed forward rotation of the left gear 45, during which the cam 44, as shown in FIG. 8, passes through the helical section 51, again brings about an axial shifting of the left actuating rod 38, however the gear shift follower 52 and the gear shift sleeve 35 on the auxiliary shaft 26 coupled to it via the shifting fork 57 are taken along this time and brought into positive engagement on the loose wheel 33. Because of this the third gear is pre-selected. Since the friction clutch 9 is still closed and the friction clutch 8 is still open, it is not yet engaged.

Figure 9:
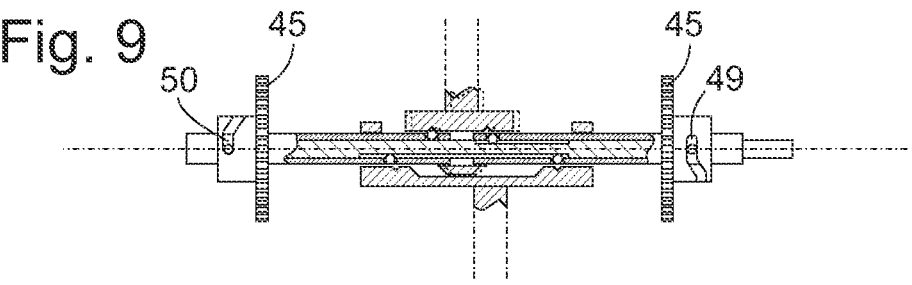
FIG. 9 is the control mechanism during the decoupling of the second gear.

In order to engage the third gear, the right gear 45, as shown in FIG. 9, is rotated back into the starting position already shown in FIG. 1, in which the right friction clutch 9 is open, while simultaneously by rotating the left gear 45 as far as to the stop position at the end of the section 50 the left friction clutch 8 is closed.

Figure 10:
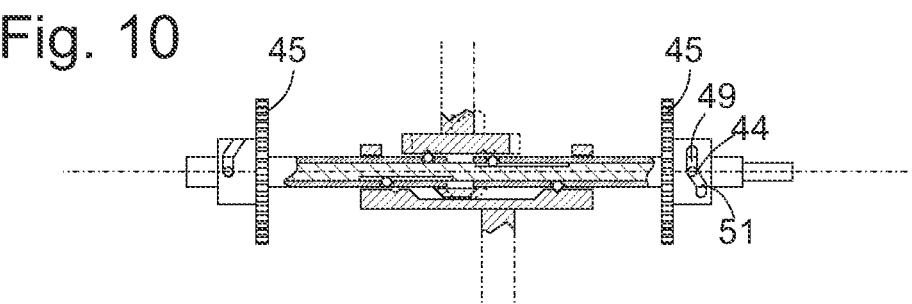
FIG. 10 is the control mechanism with engaged third gear.

In FIG. 10, the position of the left gear 45 is unchanged so that the friction clutch 8 continues to be closed and the third gear engaged. On the right gear 45 the cam 44 is again situated on the boundary between the sections 49, 51.

Figure 11:
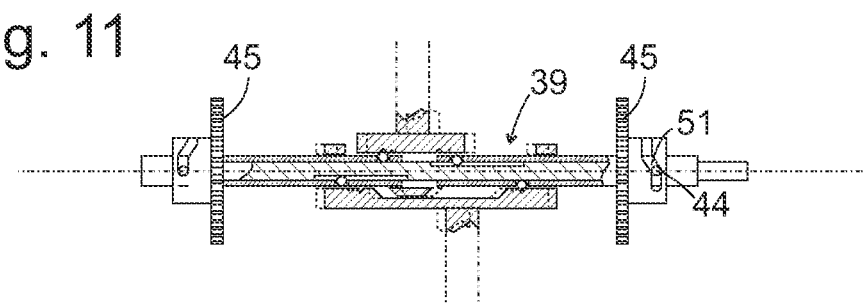
FIG. 11 is the control mechanism with engaged third and pre-selected fourth gear.

In FIG. 11, through further rotation of the right gear 45, the cam 44 is moved through the section 51 and the actuating rod 39 is deflected to the right. With it, the gear shift follower 58 which is coupled to it by the ball 64 is also deflected to the right and the gear shift sleeve 31 is in positive engagement with the gear 30.

Figure 12:
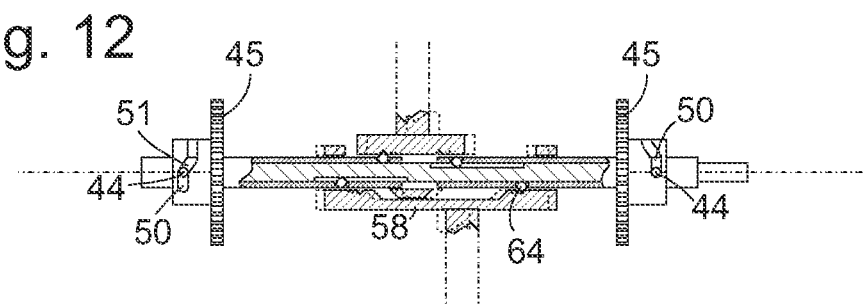
FIG. 12 is the load change from the third into the fourth gear.

In order to engage the fourth gear, the friction clutch 9 has to be closed and the friction clutch 8 opened; this takes place in turn by rotating the gears 45, 13 coupled to one another on the left and right side of the transmission so that, as shown in FIG. 12, the right cam 44 reaches the stop position at the end of the section 50 while the left cam 44 is situated at the boundary between the sections 50, 51.

Figure 13:
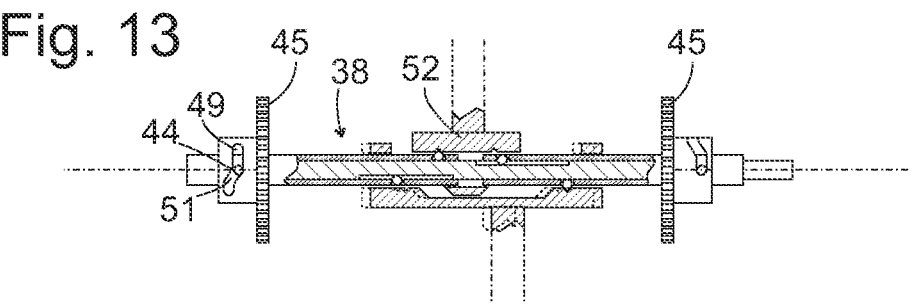
FIG. 13 is the control mechanism with engaged fourth gear.

In FIG. 13, the left gear 45 is rotated back further so that the left cam 44 is again situated between the sections 49, 51 and the gear shift follower 52 coupled to the left actuating rod 38 is again in neutral position. The fourth gear is engaged and pre-selection of the third gear cancelled.

Figure 14:
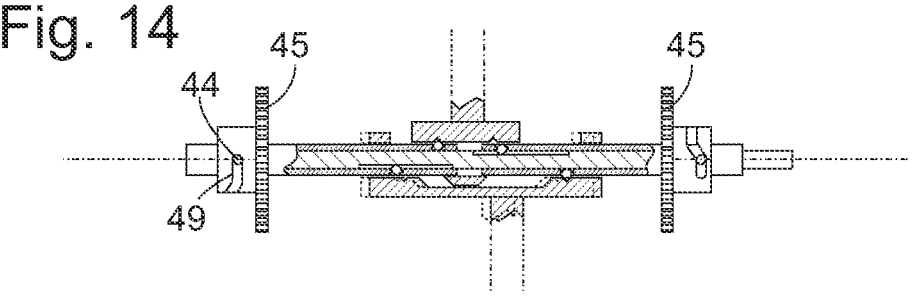
FIG. 14 is the control mechanism with engaged fifth and still pre-selected fourth gear.

In FIG. 14, the right gear 45 is again rotated into a position in which the friction clutch 9 is open while on the left gear 45 the cam 44 is situated at a stop at an end of the section 49. In this position, the friction clutch 8 is closed and the gear shift sleeve 10 couples the hollow shaft 2 to the gear wheel 22, so that a fifth gear is engaged, in the case of which the torque flow runs via the gear wheel 22 to the fixed wheel 27 of the auxiliary shaft 25.

Figure 15:
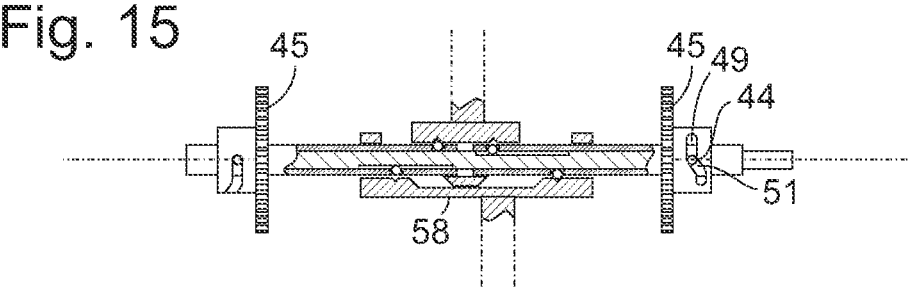
FIG. 15 is the control mechanism following cancellation of the pre-selection of the fourth gear.

In FIG. 15, the left gear 45 continues to be in the stop position in which the friction clutch 8 is closed while on the right gear 45 the cam 44 is again situated between the sections 49, 51 and the gear shift follower 58 holds the gear shift sleeve 31 in its neutral position so that the pre-selection of the fourth gear is cancelled.

Figure 16:
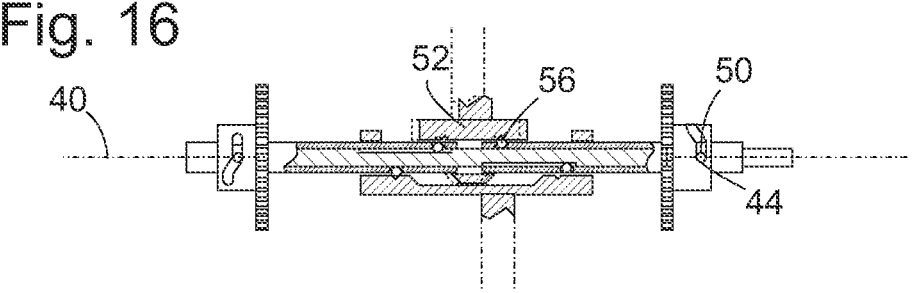
FIG. 16 is the control mechanism with engaged sixth gear.

In order to engage the sixth gear, the control rods 43 are initially rotated again about the longitudinal axis 40 so that the ball 56 engages on the gear shift follower 52. Following this, by rotating the right gear 45 until the cam 44 reaches the stop of the section 50, with simultaneous opening of the friction clutch 8, the state shown in FIG. 16 is reached, in which the sixth gear is engaged. The torque flow runs via the gears 6 and 34 to the auxiliary shaft 26.

Figure 17:
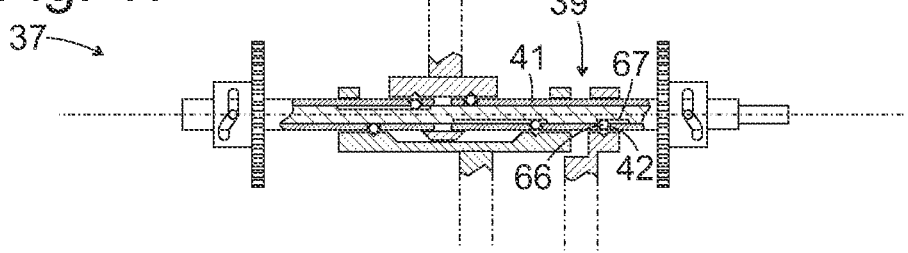
FIG. 17 is a second configuration of the control mechanism in neutral position.
Figure 18:
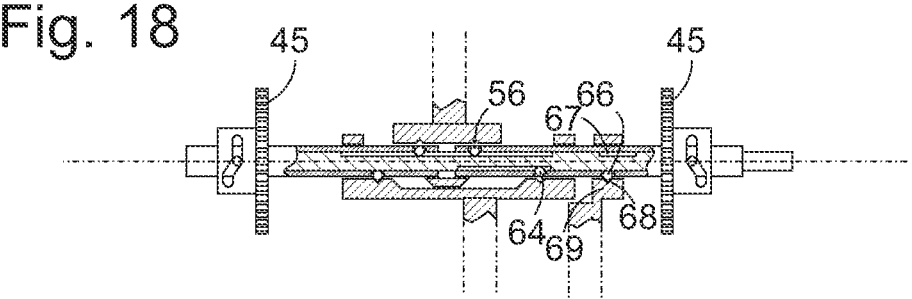
FIG. 18 is the control mechanism in a position prepared for engaging a reverse gear.

FIG. 17 shows a second configuration of the control mechanism 37. It differs from the previously considered one in that on the sleeve 41 of the right control rod 39 an additional passage 42 and on its control rod 43 an additional recess 67 is provided, which in the shown configuration receive a further ball 66. The recess 67 is wider in circumferential direction than the recess 65, so that it overlaps with the additional passage 42 in both orientations of the control rods 43 shown in FIGS. 1 to 16 and thus does not influence the gear shift change between the forward gears described above. Additionally, however, another orientation of the control rods 43 shown in FIG. 18 is adjustable by rotating about the axis 40, in which the ball 66 is forced out of the recess 67 and engages in a recess 68 of a further gear shift follower 69, while the other balls 56, 64 of the actuating rod 39 are sunk into the latter and the gear shift followers 52, 58 are thus both decoupled from the actuating rod 39. In this orientation, the gear shift follower 69 makes possible actuating a further gear shift sleeve 70 for engaging a reverse gear.

Figure 19:
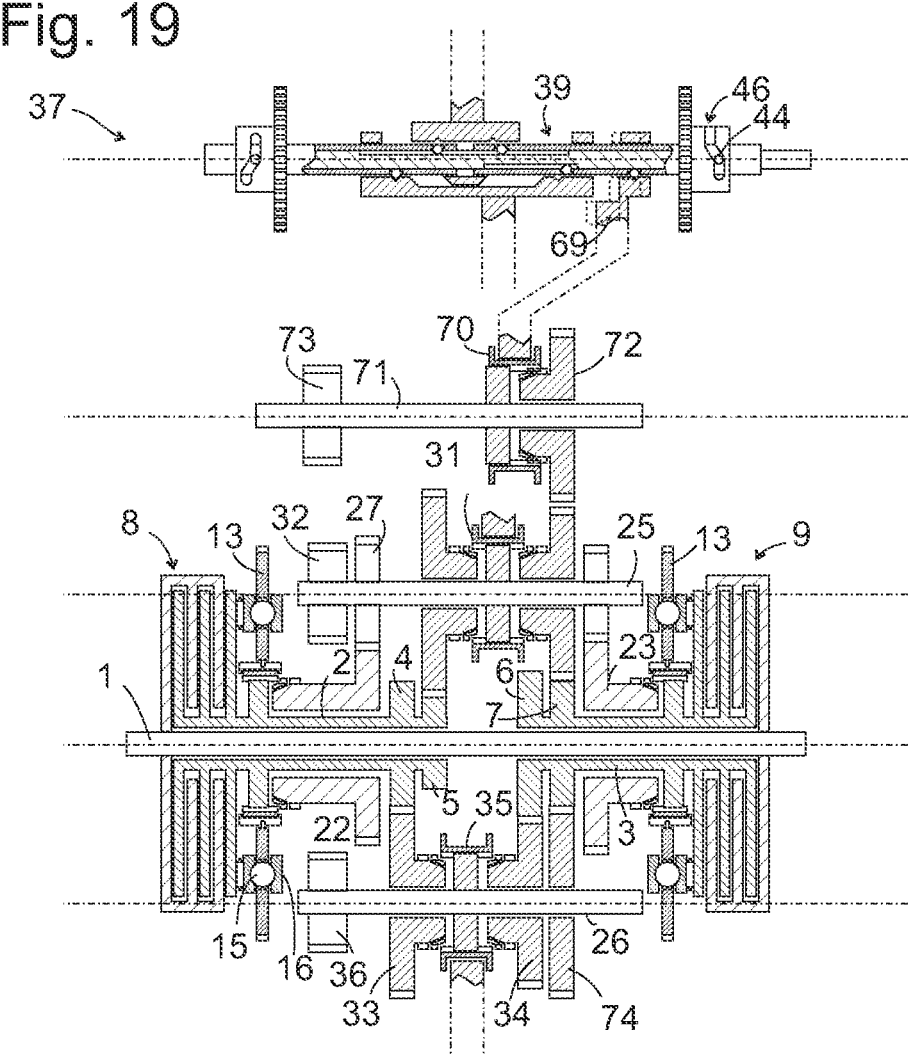
FIG. 19 is a control mechanism during the engaging of the reverse gear.

This gear shift sleeve 70 can, for example as shown in FIG. 19, be arranged on a further auxiliary shaft 71, which carries a loose wheel 72 to be coupled by the gear shift sleeve 70 and a further output pinion 73 meshing with the differential. The loose wheel 72 meshes with a loose wheel 74 on the auxiliary shaft 26, and the loose wheel 74 in turn meshes with the gear 7 on the hollow shaft 3. Through rotation of the right slotted link 46 until the cam 44 is situated at the transition between the sections 50, 51 of the slotted link 46, the gear shift sleeve 70 is pulled out of its neutral position to the right and the loose wheel 72 coupled to the auxiliary shaft 70, so that the reverse gear is pre-selected. By continuing rotating the slotted link 46 until the cam 44 is situated at the end of the section 50, the friction clutch 9 is closed and the torque flow runs via the hollow shaft 3 and the gear 7, the loose wheel 74, the loose wheel 72, the auxiliary shaft 71 and the output pinion 73.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A manual shift transmission comprising:
a first shaft;
at least one first loose wheel carried by the first shaft;
a first gear shift sleeve, which is moveable along the first shaft between a first gear position coupling the first loose wheel to the first shaft and a first neutral position allowing a rotation of the first loose wheel relative to the first shaft;
a first gear shift follower acting on the first gear shift sleeve for moving the first shift sleeve along the first shaft;
a first actuating rod for shifting the first gear shift follower in a direction towards the first shaft, wherein the first actuating rod comprises a first actuating sleeve and a first control rod moveable in the first actuating sleeve, and wherein the first actuating sleeve comprises a passage, and the first control rod comprises an exterior surface and at least one recess extending through the exterior surface into the first control rod;
a first clutch body carried on the first actuating rod and comprising at least a first ball, the first clutch body being adjustable between
a first active position in which the first ball is received within the passage of the first actuating sleeve and in a first recess of the first gear shift follower, and
a first passive position in which the first ball is received within the passage of the first actuating sleeve and the at least one recess of the first control rod, and
wherein, in the first active position, the at least one recess of the first control rod is offset relative to the passage of the first actuating sleeve such that the first ball is transferred out of the at least one recess of the first control rod and at least partially out of the passage of the first actuating sleeve by the exterior surface of the first control rod into the first recess of the first gear shift follower; and
a slotted link defining a groove with axially offset first and second circumferential sections joined by a helical section; and a cam arranged within the groove and coupled to the first actuating sleeve such that rotation of the slotted link forces the cam to axially shift the first actuating sleeve.

2. The manual shift transmission according to claim 1, further comprising a second loose wheel carried by the first shaft, wherein the first gear shift sleeve can be moved out of the neutral position into a second gear position coupling the second loose wheel to the first shaft.

3. The manual shift transmission according to claim 2, further comprising:
a third loose wheel;
a second gear shift sleeve, which is moveable along one of the first shaft or a second shaft between a third gear position coupling the third loose wheel to the one of the first shaft or the second shaft and a second neutral position allowing a rotation of the third loose wheel relative to the one of the first shaft or the second shaft; and
a second gear shift follower acting on the second gear shift sleeve for moving the second gear shift sleeve along the one of the first shaft or the second shaft;
wherein the first actuating rod carries a second clutch body, which is adjustable between a second active position engaging in a recess of the second gear shift follower and a second passive position sunk into the first actuating rod.

4. The manual shift transmission according to claim 3, wherein the second clutch body is received in a second passage of the first actuating sleeve and the at least one recess of the first control rod in the second passive position, and the at least one recess of the first control rod is set off against the second passage in the second active position.

5. The manual shift transmission according to claim 4, wherein a position of the first control rod exists in which the first and second clutch bodies are jointly situated in first and second passive positions.

6. The manual shift transmission according to claim 1, wherein the at least one recess of the first control rod is elongated in a longitudinal direction of the first actuating rod with a length in the longitudinal direction at least equal to a freedom of movement of the first actuating rod.

7. The manual shift transmission according to claim 1, wherein the first control rod is rotatable between the first active and the first passive position about a longitudinal axis of the first actuating rod.

8. The manual shift transmission according to claim 7, wherein the at least one recess of the first control rod is elongated in a longitudinal direction of the first actuating rod with a length in the longitudinal direction at least equal to a freedom of movement of the first actuating rod.

9. The manual shift transmission according to claim 1 further comprising a second actuating rod carrying a third clutch body which is adjustable between third active position engaging in a second recess of the first gear shift follower and a third passive position sunk into the second actuating rod, wherein the second actuating rod shifts in the direction towards the first shaft for shifting the first gear shift follower.

10. The manual shift transmission according to claim 9 wherein the second actuating rod comprises a second actuating sleeve and a second control rod moveable in the second actuating sleeve, and the first and second control rods of the first and the second actuating rods are connected to one another.

11. The manual shift transmission according to claim 9 wherein the slotted link is rotatable about the first actuating rod.

12. The manual shift transmission according to claim 11, wherein the helical section of the slotted link interacts with the cam when the first gear shift sleeve is situated between the first neutral position and the first gear position, and wherein the first circumferential section of the slotted link interacts with the cam when the first gear shift sleeve is situated in the first gear position.

13. The manual shift transmission according to claim 12, wherein a single actuator drives the rotation of the slotted link for opening and closing movement of a friction clutch.

14. The manual shift transmission according to claim 12, wherein the second circumferential section of the slotted link interacts with the cam when the first gear shift sleeve is situated in the first neutral position.

15. The manual shift transmission according to claim 1, wherein the at least one recess of the first control rod extends in a longitudinal direction such that rotation of the first control rod about a longitudinal axis of the first actuating rod shifts the first clutch body between the first active position and the first passive position by transferring the first ball in and out of the at least one recess of the first control rod depending on a circumferential position of the at least one recess.

\* \* \* \* \*